United States Patent
Emmott

(10) Patent No.: US 7,775,420 B2
(45) Date of Patent: Aug. 17, 2010

(54) APPARATUS AND METHODS FOR REUSING A MAILER

(76) Inventor: Gary Glenn Emmott, 1114 Nantucket, Unit E, Houston, TX (US) 77057

( * ) Notice: Subject to any disclaimer, the term of this patent is extended or adjusted under 35 U.S.C. 154(b) by 1096 days.

(21) Appl. No.: 11/384,903

(22) Filed: Mar. 20, 2006

(65) Prior Publication Data

US 2006/0208053 A1 Sep. 21, 2006

Related U.S. Application Data

(60) Provisional application No. 60/663,849, filed on Mar. 21, 2005.

(51) Int. Cl.
*B65D 27/06* (2006.01)
(52) U.S. Cl. .................... 229/305; 229/303; 229/306
(58) Field of Classification Search .......... 229/301–306
See application file for complete search history.

(56) References Cited

U.S. PATENT DOCUMENTS

| 886,449 A | 5/1908 | West |
| 1,438,122 A | 12/1922 | McCoy |
| 2,201,538 A * | 5/1940 | Holden ................ 229/306 |
| 2,928,583 A * | 3/1960 | Law .................... 229/305 |
| 3,111,257 A | 11/1963 | Peach |
| 3,113,716 A * | 12/1963 | Howard ................ 229/304 |
| 3,152,751 A | 10/1964 | Hiersteiner |
| 3,261,623 A * | 7/1966 | Kiedrowski ............ 229/69 |
| 3,874,582 A * | 4/1975 | Wang ................... 229/303 |
| 3,982,689 A | 9/1976 | Retrum |
| 4,775,095 A | 10/1988 | Emmott |
| 4,993,624 A | 2/1991 | Schlich |
| 5,282,568 A | 2/1994 | File |
| 5,324,927 A | 6/1994 | Williams |
| 5,400,957 A * | 3/1995 | Stude ................... 229/303 |
| 5,510,608 A | 4/1996 | Williams |
| 5,514,863 A | 5/1996 | Williams |
| 5,738,274 A * | 4/1998 | Stude ................... 229/301 |
| 2008/0041928 A1* | 2/2008 | DeLaVergne ............ 229/301 |

FOREIGN PATENT DOCUMENTS

| WO | WO 00/10885 | 3/2000 |
| WO | WO 2004/076296 A2 | 9/2004 |

* cited by examiner

*Primary Examiner*—Jes F Pascua
(74) *Attorney, Agent, or Firm*—Fraser Clemens Martin & Miller LLC; William J. Clemens

(57) ABSTRACT

In some embodiments, a reusable mailer capable of preventing the undesirable positioning during re-mailing thereof of at least one postal marking that may be made to the mailer during processing of the initial mailing thereof includes a removable initial seal flap disposed near the bottom of the mailer during the initial mailing thereof.

22 Claims, 8 Drawing Sheets

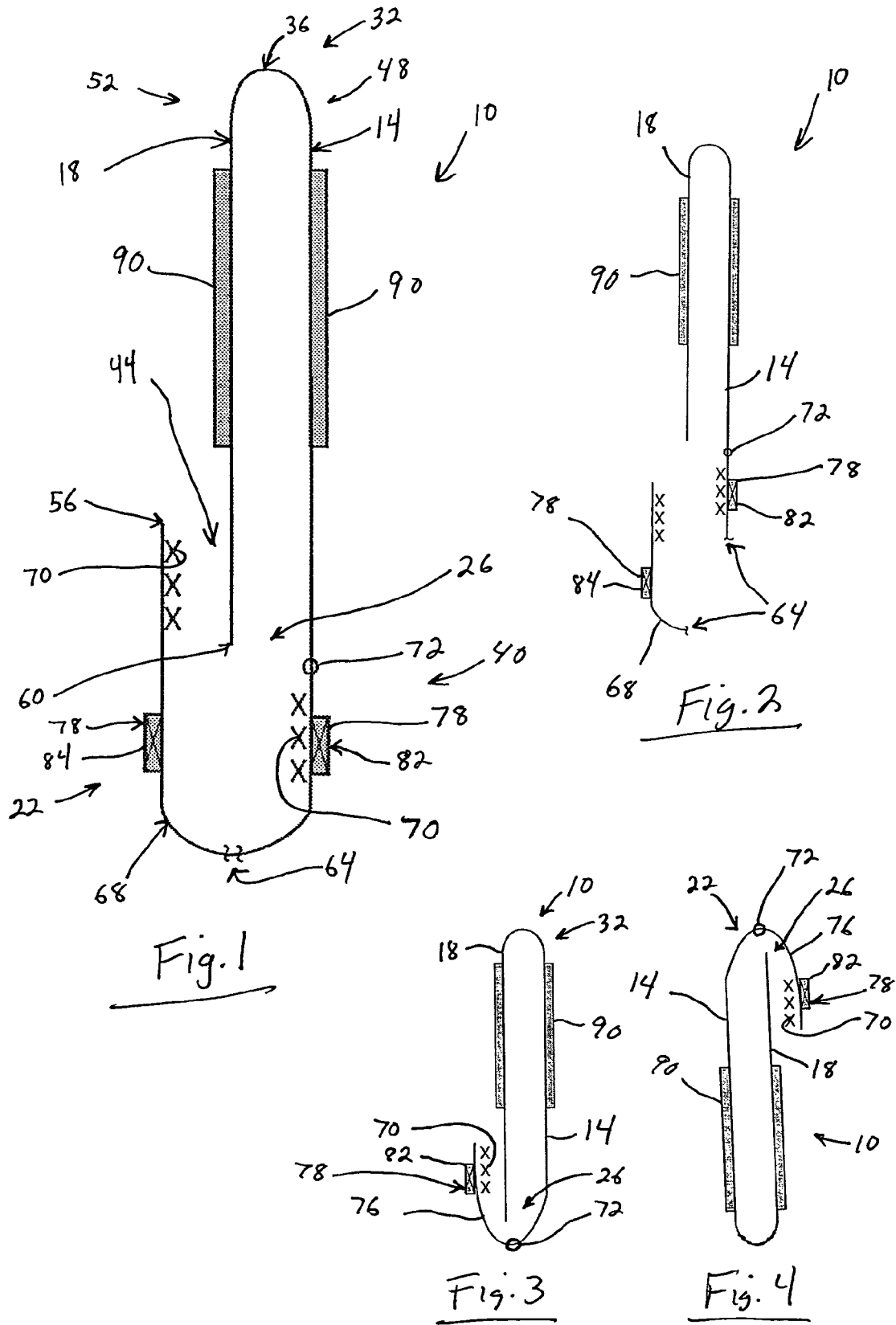

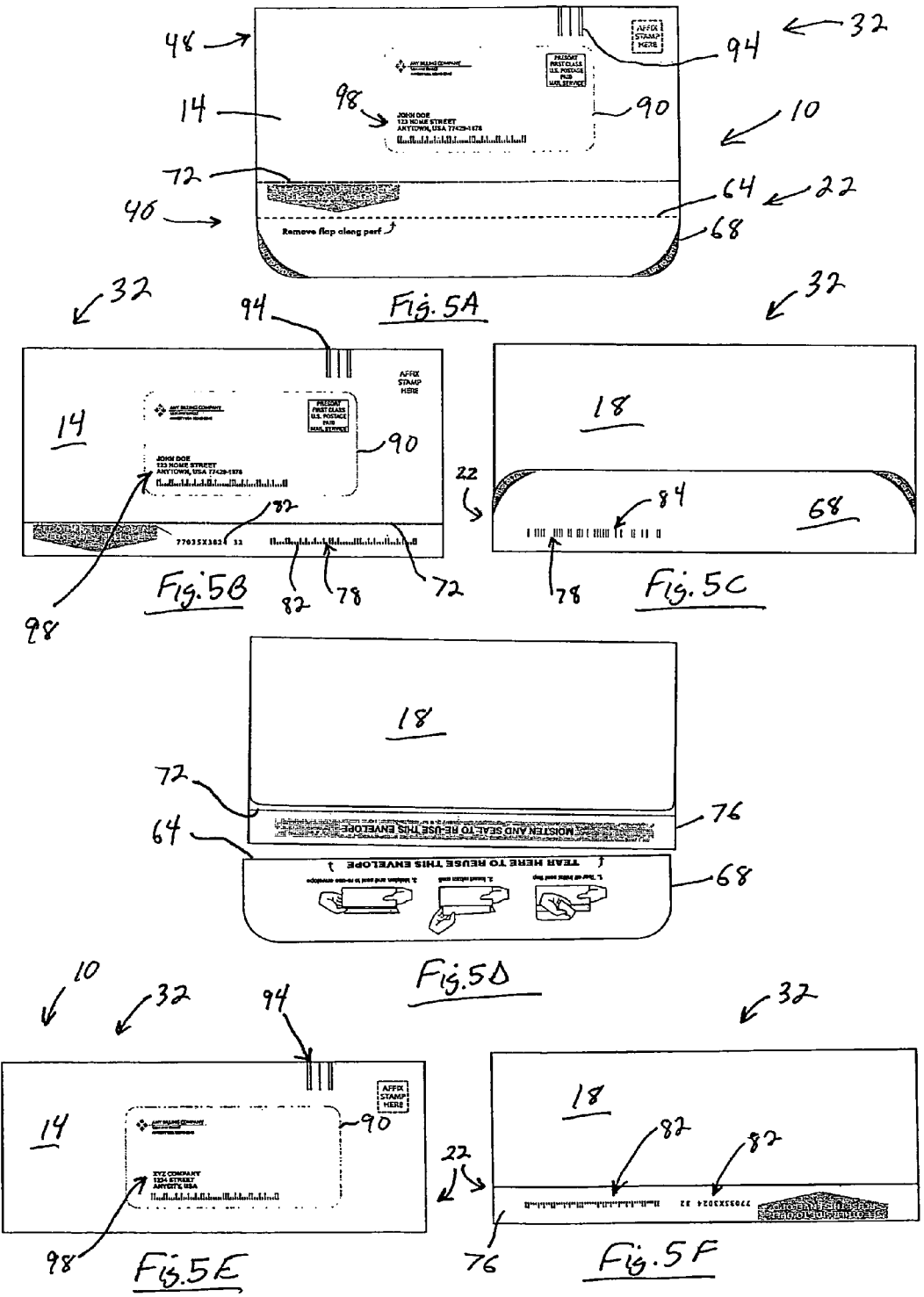

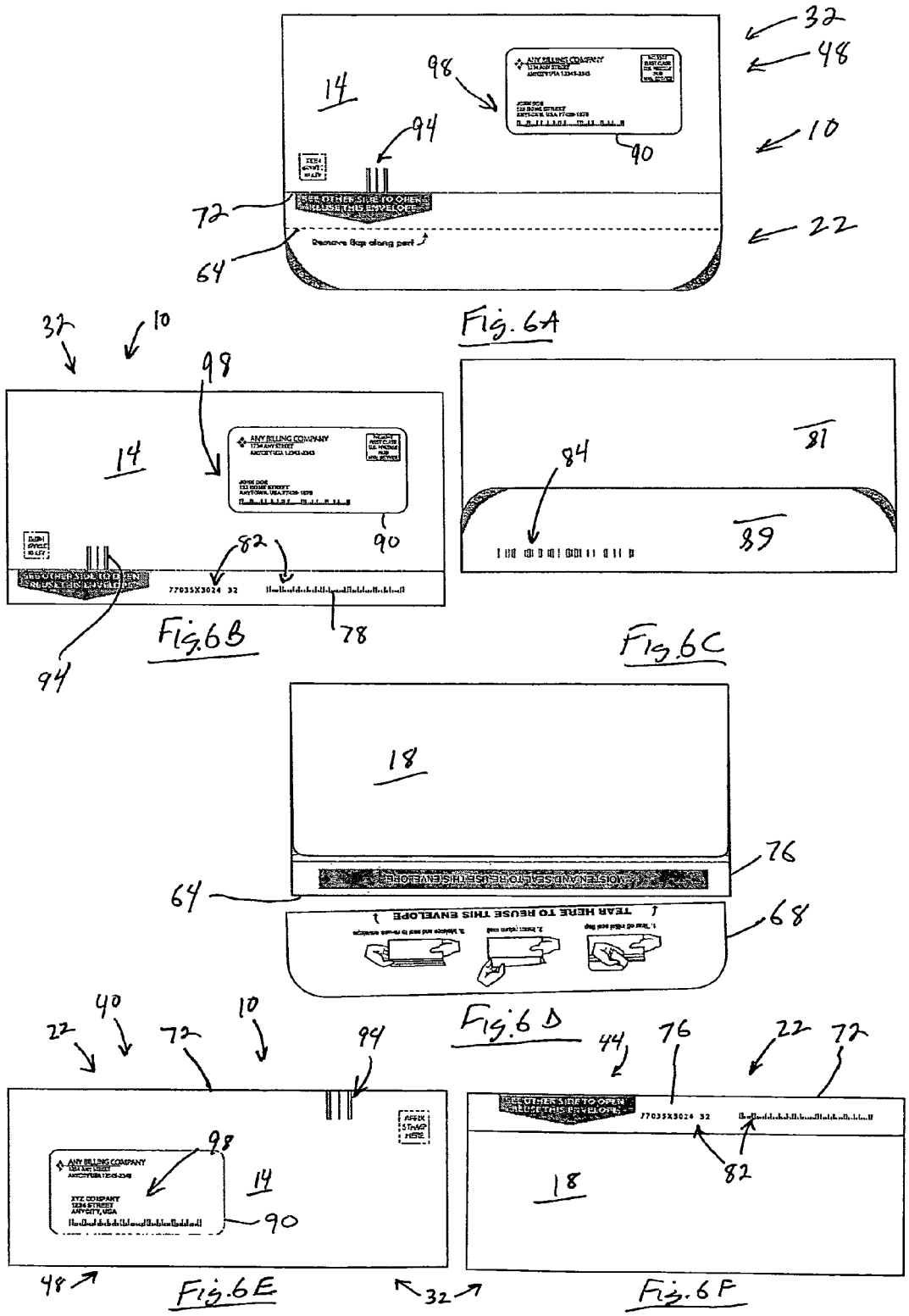

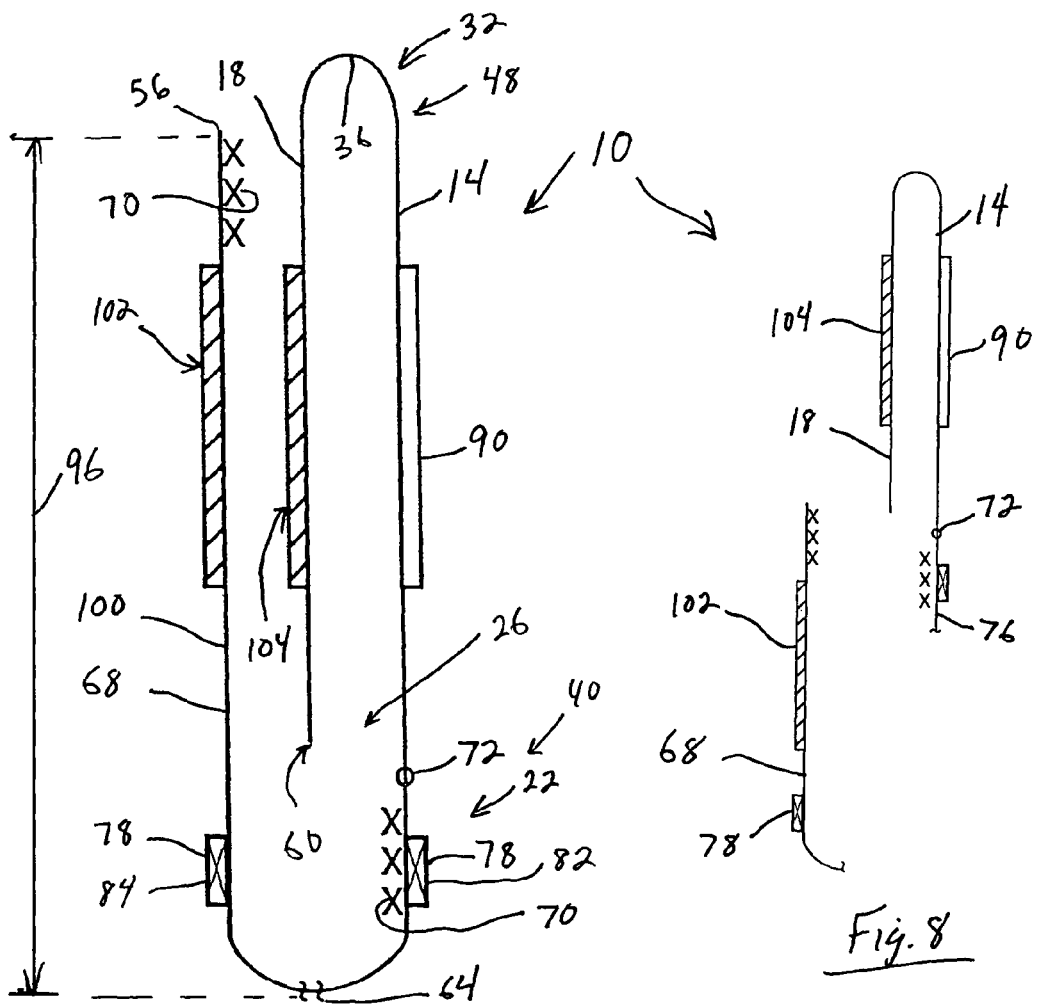
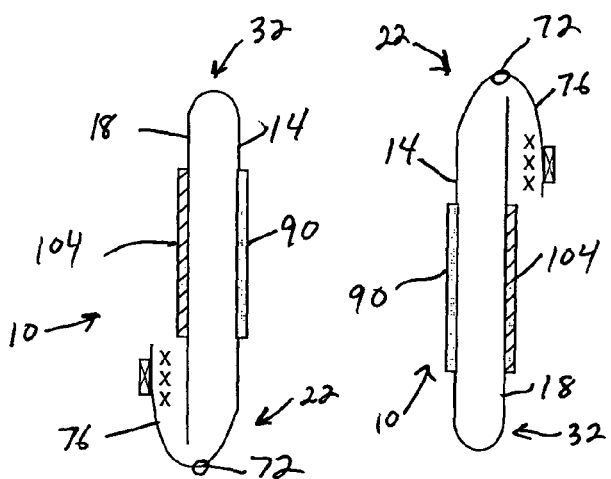
Fig. 7
Fig. 8
Fig. 9
Fig. 10

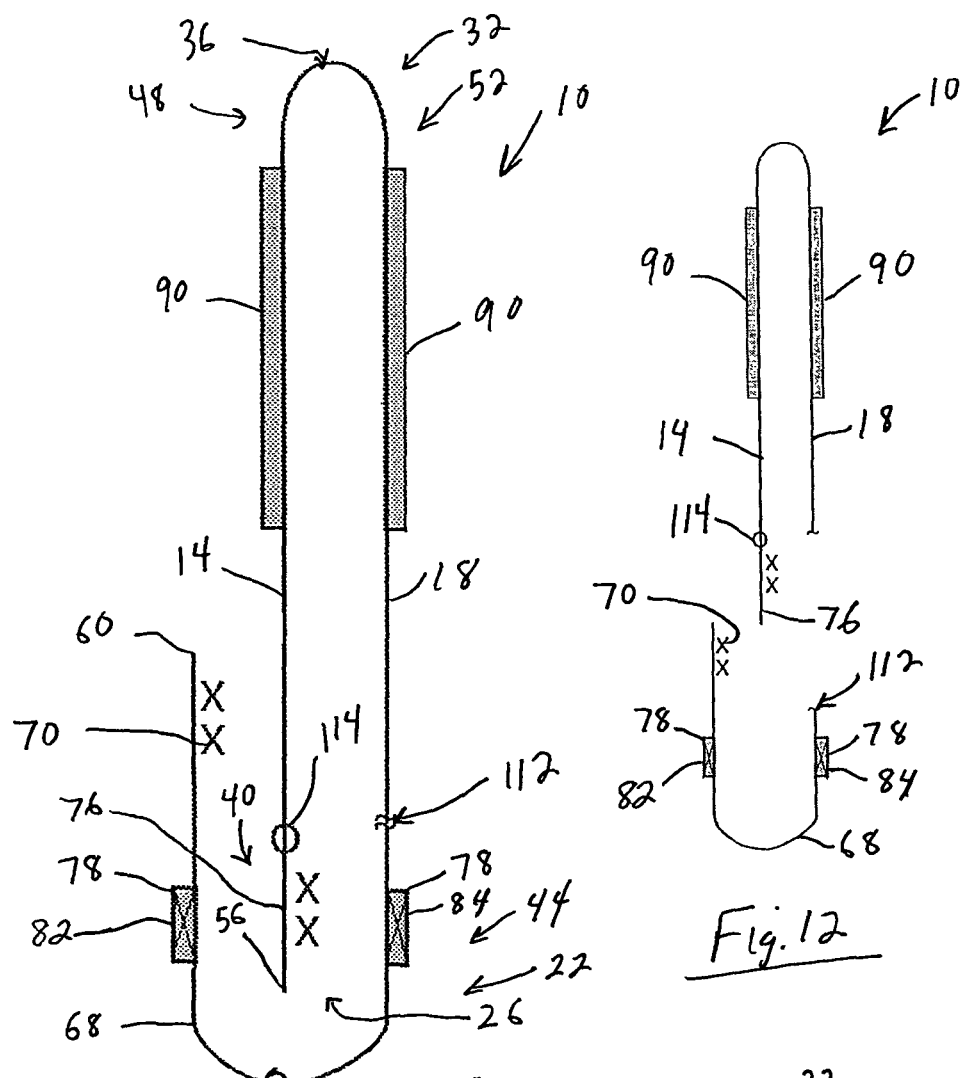
Fig. 11
Fig. 12
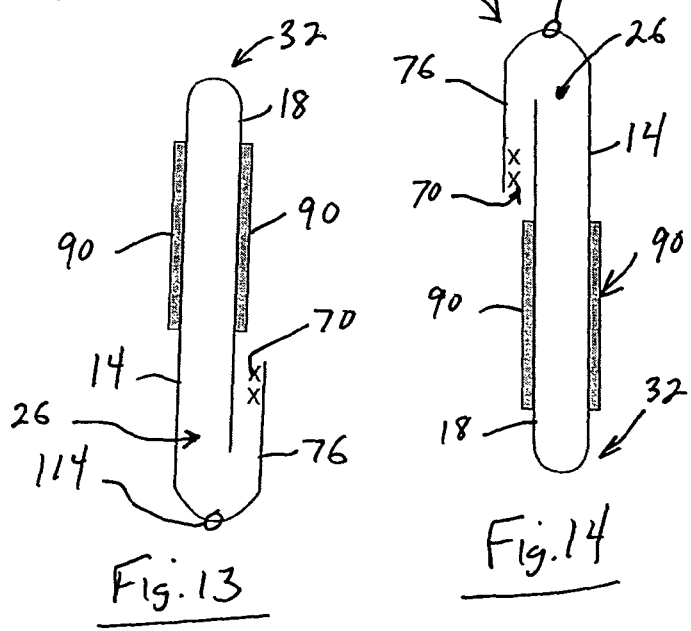
Fig. 13
Fig. 14

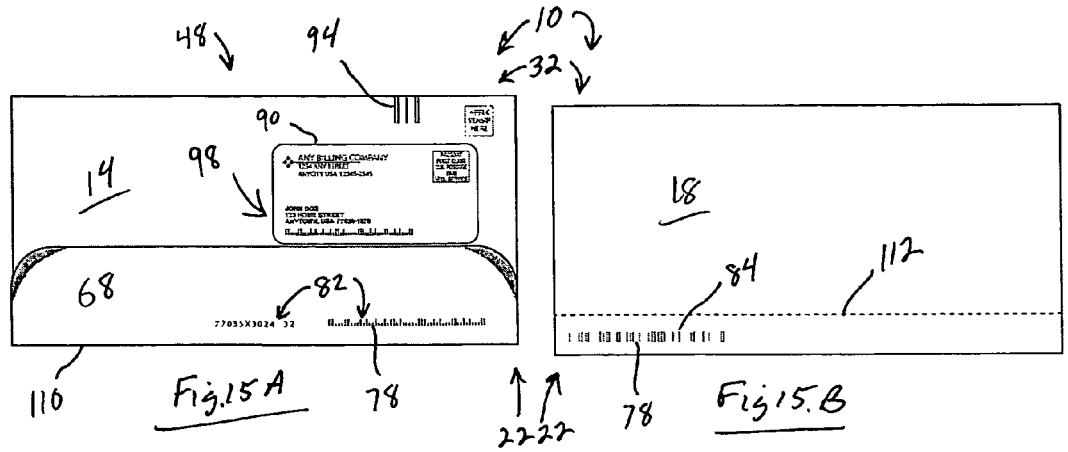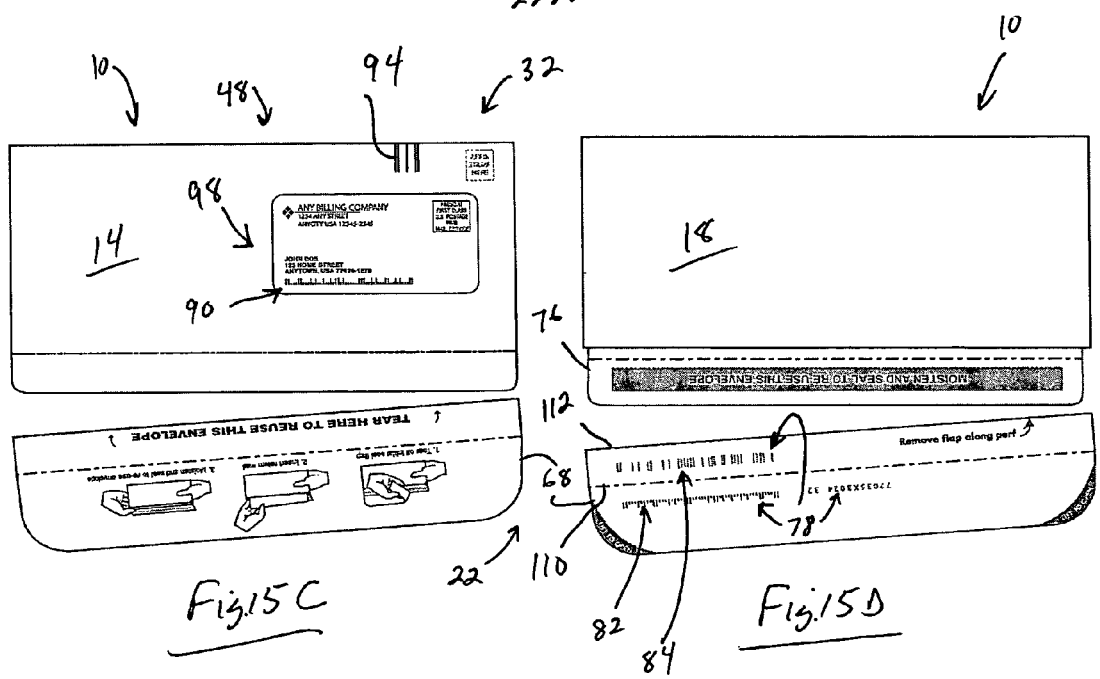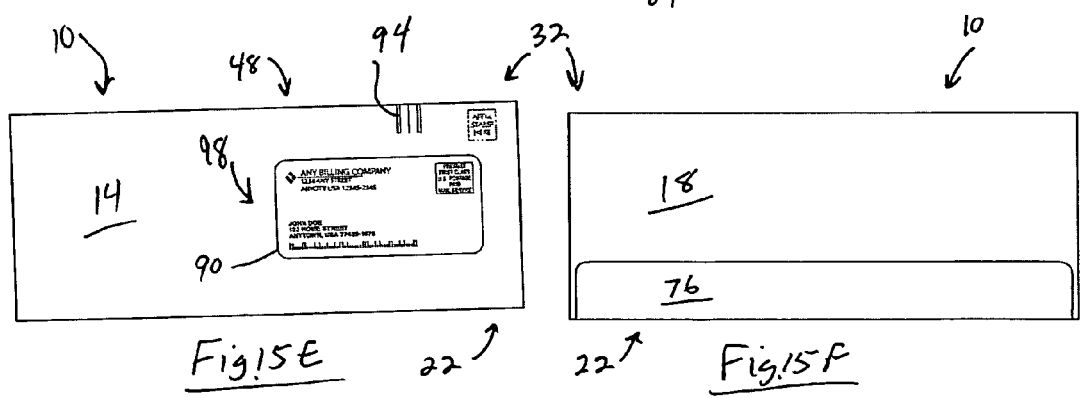

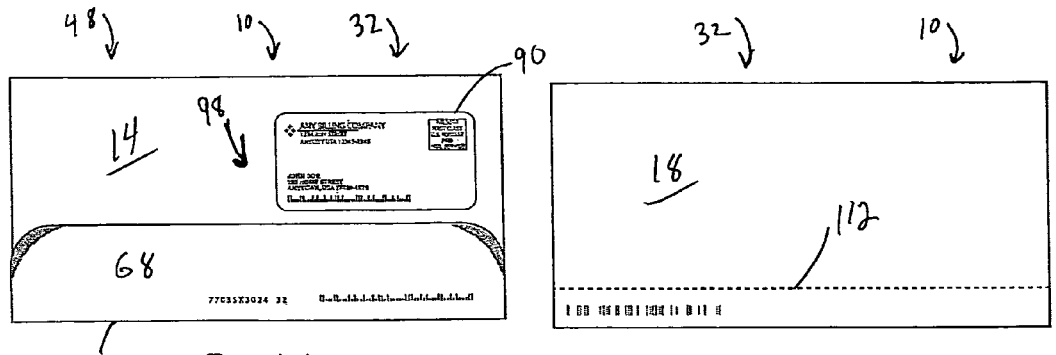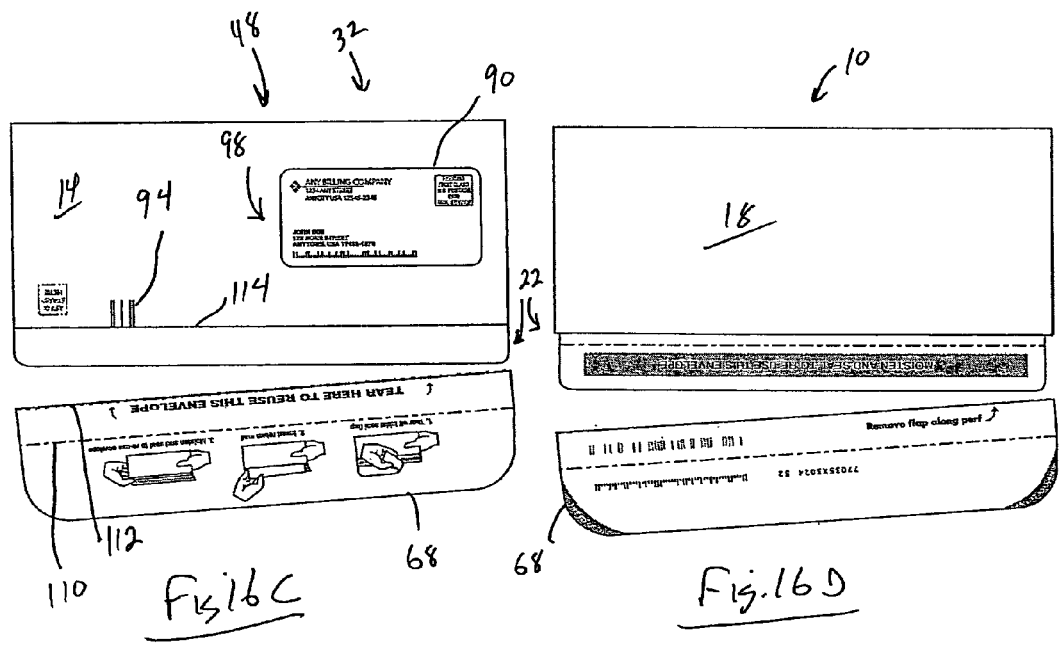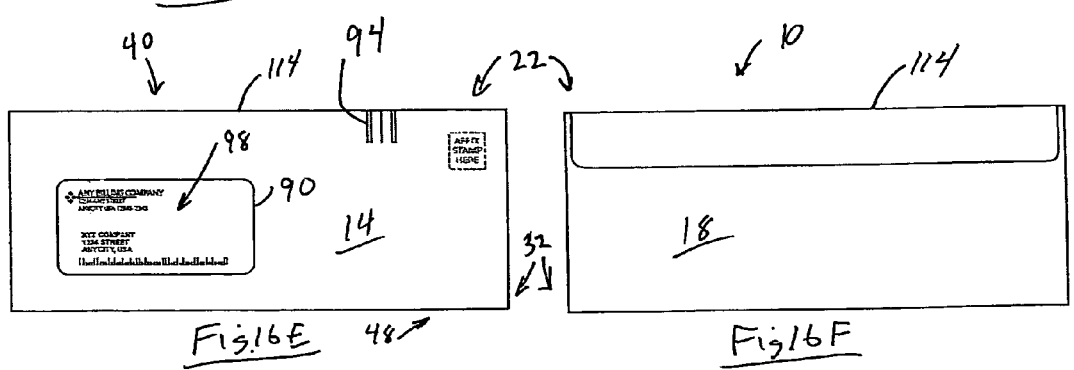

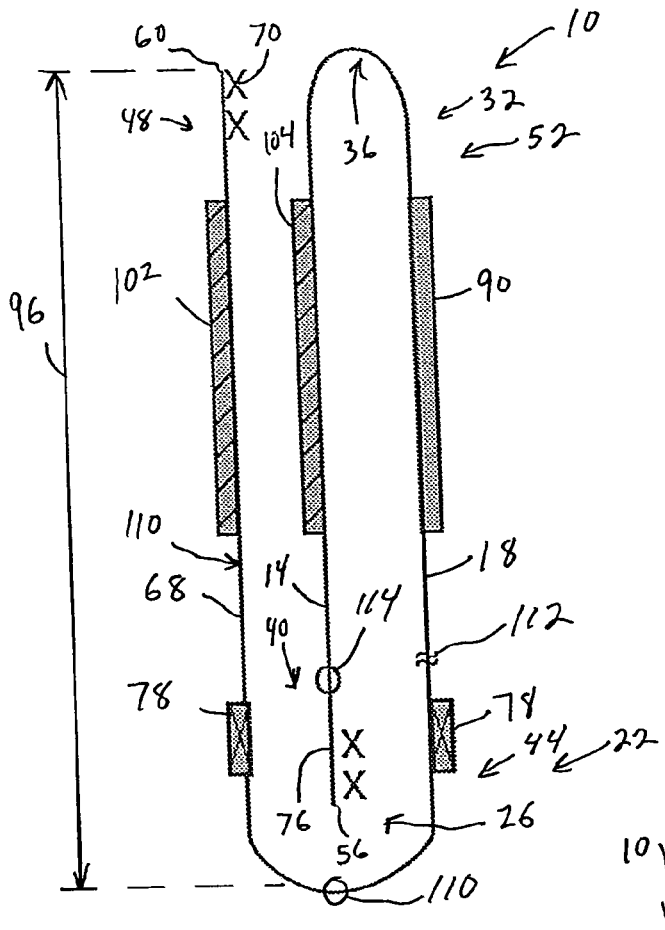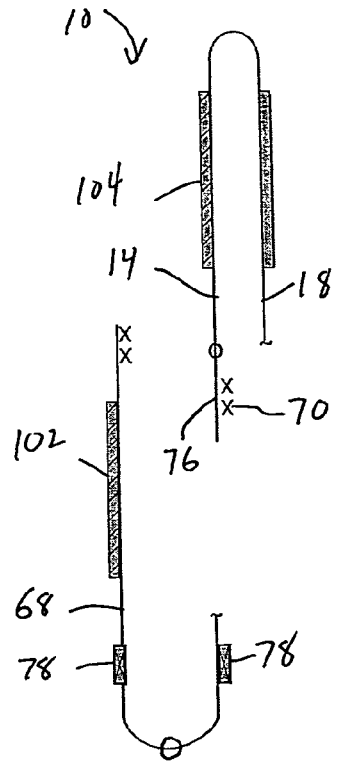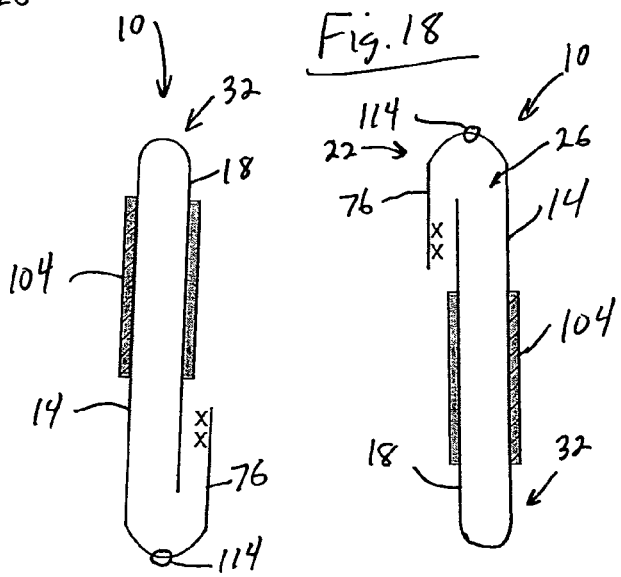
Fig. 17
Fig. 18
Fig. 19
Fig. 20

APPARATUS AND METHODS FOR REUSING A MAILER

This application claims the benefit of U.S. Provisional Application Ser. No. 60/663,849 filed Mar. 21, 2005 and entitled "Envelope/Enclosure Method of Manufacture and Use Anti-Loop Mail Format."

BACKGROUND OF THE INVENTION

The invention relates to methods, apparatus and systems involving reusable mailers.

Single mail pieces, such are envelopes, carriers, packages, forms and other items, are sometimes designed for multiple uses. For example, such mail pieces, sometimes referred to as "reusable", "two-way" and "re-mailable" mailers, are often designed for an outbound delivery and a return mailing.

A common challenge in the design and use reusable mailers is the location of mailing information, such as sender and recipient address information, postage and other mail data. Because the reusable mailer will typically have different mailing information for the initial and subsequent mailings, the inclusion or location of such information on the reusable mailer may cause mistakes in the postal processing of the mailer during the initial and/or subsequent mailing(s).

Another issue that may be important in the design and formatting of reusable mailers is cost. As billions of mail pieces are used every year and comprise a multi-billion dollar industry, usefulness of a particular feature, design or capability is driven by manufacturing costs. Reducing such costs, even by one cent per mailer, may be critical in the usefulness of a feature, design or capability of any particular mailer.

An example problem that may occur during the re-mail postal processing of a reusable mailer is the undesirable reading of postal marking made to the mailer during its initial mailing. Some examples of such postal markings are outbound postnet barcodes or ID markings, corrective spray address information and fluorescent code or ID markings, which may be applied to the mailer during it initial, or outbound, postal processing. The reading of one or more such marking, such as by automated postal equipment, during the subsequent or re-mailing thereof may negatively affect the processing of the mailer. For example, "loop mail" occurs when addressing or postal information (e.g. postage markings, addressing information, postnet markings and fluorescent ID tags) utilized during the initial mail processing of the mailer is mistakenly read or processed during the re-mailing thereof and may result in redirecting of the mailer back to the original addressee or making the mailer undeliverable.

Another example potential problem that may occur is the misreading, during the initial mailing, of mailing information included on the mailer for use during the re-mailing thereof. For example, it is often desirable to pre-print return postal graphics, such as FIM bars and postal indicia, on the mailer. However, if any of these items are read during the processing of the initial mailing of the mailer, the mailer may be redirected or made undeliverable.

It should be understood that the above-described examples, features and/or disadvantages are provided for illustrative purposes only and are not intended to limit the scope or subject matter of the claims of this patent application or any patent or patent application claiming priority hereto. Thus, none of the appended claims or claims of any related application or patent should be limited by the above discussion or construed to address, include or exclude the cited examples, features and/or disadvantages, except and only to the extent as may be expressly stated in a particular claim.

Accordingly, there exists a need for apparatus and methods useful with reusable mailers having one or more of the following attributes, capabilities or features: prevents the undesirable location or positioning during re-mailing thereof of initial mailing postal processing information located on the mailer; prevents the reading, during re-mailing, of at least one postal marking that may be made to the mailer during processing of the initial mailing thereof; includes an initial seal flap at the bottom of the mailer useful for removing initial mailing information (initial mailing addresses, postage or a combination thereof) and/or postal markings made during postal processing during the initial mailing from the mailer and before the re-mailing thereof; includes a re-seal flap that conceals and/or repositions postal markings made to the mailer during the initial mailing thereof; is re-sealable in a way that ensures postal marking made during the initial mailing thereof will not affect the re-mailing thereof; facilitates automation mail processing of the mailing during re-mailing; eliminates loop mail; including return postal graphics printed on the mailer but positioned outside the initial mailing postal processing scan zone; includes pre-printed FIM bars for re-mailing but which do not interfere with initial mailing of the mailer; is cost effective; is easy to manufacture; is easy to assemble and use; or any combination thereof.

BRIEF SUMMARY OF THE INVENTION

In various embodiments, the present invention involves a reusable mailer capable of preventing the undesirable positioning during re-mailing thereof of at least one postal marking that may be made to the mailer during processing of its initial mailing. The reusable mailer includes a front panel and a rear panel, a first end having an opening, and a second end opposite to the first end and having a closure. The front and rear panels have respective first and second ends corresponding to the first and second ends of the mailer, respectively. Each of the first ends of the front and rear panels terminate at a respective edge.

In some embodiments, a perforation line is formed in the front panel in spaced proximity with the edge of the front panel. A removable initial seal flap extends from the perforation line to the edge of the front panel. When the front panel is folded along the perforation line, the initial seal flap covers the opening of the mailer and is sealable to the rear panel for the initial mailing of the mailer. The initial seal flap is removable from the mailer upon separating at the perforation line. A fold line is disposed on the front panel in spaced proximity with the perforation line and between the perforation line and the second end of the front panel. After the initial seal flap is removed from the mailer, the front panel is foldable along the fold line to form a re-seal flap that covers the opening of the mailer and is sealable to the rear panel for re-mailing the mailer. During re-mailing of the mailer, any postal marking made during the initial mailing thereof to the initial seal flap will be removed from the mailer, and any postal marking made during the initial mailing of the mailer to the front panel between the fold line and the perforation line will be located on the re-mail flap affixed to the rear panel.

In certain embodiments, a first fold line is formed in the rear panel in spaced proximity with the edge of the rear panel. A removable initial seal flap on the rear panel extends between the first fold line and the edge of the rear panel. When the rear panel is folded along the first fold line, the initial seal flap covers the opening of the mailer and is sealable to the front panel for the initial mailing of the mailer. The initial seal flap is removable from the mailer upon separating at a perforation line formed in the rear panel in spaced proximity with the first fold line and between the first fold line and the second end of the rear panel. A second fold line is disposed on the front panel in spaced proximity with the edge of the first panel. After the initial seal flap is removed from the mailer, the front panel is foldable along the second fold line to form a re-seal flap that covers the opening of the mailer and is sealable to the rear panel for re-mailing of the mailer. During re-mailing of the mailer, any postal marking made during the initial mailing thereof to the initial seal flap and on the rear panel between the perforation line and the first fold line will be removed from the mailer.

The present invention includes embodiments of a reusable mailer that is useful for removing, concealing or repositioning during re-mailing thereof of at least one among a postnet barcode, florescent code and an ID marking that may be made to the mailer during processing of the initial mailing thereof to ensure the same does not negatively affect the postal processing of the mailer during re-mailing thereof. The reusable mailer of this embodiment includes a front panel and a rear panel, a first end having an opening, and a second end opposite to the first end and having a closure. The first end of the mailer serves as the bottom of the mailer during the initial mailing thereof. The front and rear panels include respective first and second ends corresponding to the first and second ends of the mailer, respectively. Each of the first ends of the front and rear panels terminates at a respective edge. A removable initial seal flap is disposed upon at least one among the front and rear panels. The initial seal flap is capable of covering the opening of the mailer and being engageable to the other of the front and rear panels for the initial mailing of the mailer. A re-seal flap disposed upon at least one among the front and rear panels is capable of covering the opening of the mailer and being sealable to the other of the front and rear panels for re-mailing the mailer.

Accordingly, the present invention includes features and advantages which are believed to enable it to advance reusable mailer technology. Characteristics and advantages of the present invention described above and additional features and benefits will be readily apparent to those skilled in the art upon consideration of the following detailed description of preferred embodiments and referring to the accompanying drawings.

BRIEF DESCRIPTION OF THE DRAWINGS

The following figures are part of the present specification, included to demonstrate certain aspects of presently preferred embodiments of the invention and referenced in the detailed description herein.

FIG. 1 is a side view of an embodiment a reusable mailer in accordance with the present invention;

FIG. 2 is a side view of the embodiment of FIG. 1 showing an exemplary initial seal flap separated from the exemplary mailer;

FIG. 3 is a side view of the embodiment of FIG. 1 showing an exemplary re-seal flap in a position to be engaged to the rear panel of the exemplary mailer;

FIG. 4 is a side view of the embodiment of FIG. 1 showing the exemplary re-seal flap in a position to be engaged to the rear panel of the exemplary mailer in an inverted position;

FIG. 5A is a front view of an embodiment of an envelope-type mailer in a pre-mailing condition in accordance with the present invention;

FIG. 5B is a front view of the embodiment of FIG. 5A showing the exemplary mailer in an initial mailing condition and showing example postal markings made to the mailer during the initial mailing thereof;

FIG. 5C is a rear view of the embodiment of FIG. 5B showing an exemplary initial seal flap engaged to the rear panel of the exemplary mailer;

FIG. 5D is a rear view of the embodiment of FIG. 5A showing the initial seal flap of the exemplary mailer being removed;

FIG. 5E is a front view of the embodiment of FIG. 5A showing the exemplary mailer in a re-mail condition having a re-seal flap engaged to the rear panel of the mailer;

FIG. 5F is a rear view of the embodiment of FIG. 5E;

FIG. 6A is a front view of another embodiment of an envelope-type mailer in a pre-mailing condition in accordance with the present invention;

FIG. 6B is a front view of the embodiment of FIG. 6A showing the exemplary mailer in an initial mailing condition and showing example postal markings made to the mailer during the initial mailing thereof;

FIG. 6C is a rear view of the embodiment of FIG. 6B;

FIG. 6D is a rear view of the embodiment of FIG. 6A showing the initial seal flap of the exemplary mailer being removed;

FIG. 6E is a front view of the embodiment of FIG. 6A showing the exemplary mailer inverted in a re-mail condition having an exemplary re-seal flap engaged to the rear panel of the mailer;

FIG. 6F is a rear view of the embodiment of FIG. 6E;

FIG. 7 is a side view of another embodiment of a reusable mailer having an extended initial seal flap in accordance with the present invention;

FIG. 8 is a side view of the embodiment of FIG. 7 showing the an exemplary initial seal flap separated from the exemplary mailer;

FIG. 9 is a side view of the embodiment of FIG. 7 showing an exemplary re-seal flap in a position to be engaged to the rear panel of the exemplary mailer;

FIG. 10 is a side view of the embodiment of FIG. 7 showing the exemplary re-seal flap in a position to be engaged to the rear panel of the exemplary mailer in an inverted position;

FIG. 11 is a side view of another embodiment of a reusable mailer in accordance with the present invention;

FIG. 12 is a side view of the embodiment of FIG. 11 showing an exemplary initial seal flap separated from the exemplary mailer;

FIG. 13 is a side view of the embodiment of FIG. 11 showing an exemplary re-seal flap in a position to be engaged to the rear panel of the exemplary mailer;

FIG. 14 is a side view of the embodiment of FIG. 11 showing the exemplary re-seal flap in a position to be engaged to the rear panel of the exemplary mailer in an inverted position;

FIG. 15A is a front view of an embodiment of an envelope-type mailer in an initial mailing condition having an exemplary initial seal flap engaged to the front panel of the mailer in accordance with the present invention and showing example postal markings made to the mailer during the initial mailing thereof;

FIG. 15B is a rear view of the embodiment of FIG. 15A;

FIG. 15C is a front view of the embodiment of FIG. 15A showing an exemplary initial seal flap of the mailer being removed after the initial mailing thereof;

FIG. 15D is a rear view of the embodiment of FIG. 15C;

FIG. 15E is a front view of the embodiment of FIG. 15A showing the mailer in a re-mail condition having an exemplary re-seal flap engaged to the rear panel of the mailer;

FIG. 15F is a rear view of the embodiment of FIG. 15E;

FIG. 16A is a front view of another embodiment of an envelope-type mailer in an initial mailing condition having an exemplary initial seal flap engaged to the front panel of the mailer in accordance with the present invention and showing example postal markings made to the mailer during the initial mailing thereof;

FIG. 16B is a rear view of the embodiment of FIG. 16A;

FIG. 16C is a front view of the embodiment of FIG. 16A showing an exemplary initial seal flap of the exemplary mailer being removed after the initial mailing thereof;

FIG. 16D is a rear view of the embodiment of FIG. 16C;

FIG. 16E is a front view of the embodiment of FIG. 16A showing the exemplary mailer inverted in a re-mail condition having an exemplary re-seal flap engaged to the rear panel of the mailer;

FIG. 16F is a rear view of the embodiment of FIG. 16E;

FIG. 17 is a side view of another embodiment a reusable mailer having an extended initial seal flap in accordance with the present invention;

FIG. 18 is a side view of the embodiment of FIG. 17 showing an exemplary initial seal flap separated from the exemplary mailer;

FIG. 19 is a side view of the embodiment of FIG. 17 showing an exemplary re-seal flap in a position to be engaged to the rear panel of the exemplary mailer; and FIG. 20 is a side view of the embodiment of FIG. 17 showing the exemplary re-seal flap in a position to be engaged to the rear panel of the exemplary mailer in an inverted position.

DETAILED DESCRIPTION OF PRESENTLY PREFERRED EMBODIMENTS

Characteristics and advantages of the present invention and additional features and benefits will be readily apparent to those skilled in the art upon consideration of the following detailed description of presently preferred embodiments of the claimed invention and referring to the accompanying figures. It should be understood that the description herein and appended drawings, being of preferred embodiments, are not intended to limit the appended claims or the claims of any patent or patent application claiming priority to this application. On the contrary, the intention is to cover all modifications, equivalents, and alternatives falling within the spirit and scope of the claims. Many changes may be made to the particular embodiments and details disclosed herein without departing from such spirit and scope.

In showing and describing the preferred embodiments, like or identical reference numerals are used to identify common or similar elements. In many instances, common or similar elements are evident from the figures themselves absent reference numerals. The figures are not necessarily to scale and certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean the invention of every possible embodiment of the invention or any particular claim or claims. Thus, the subject matter of each such reference should not be considered as necessary for, or part of, every embodiment of the invention or any particular claim(s) merely because of such reference. Also, it should be noted that reference herein and in the appended claims to components and aspects in a singular tense does not necessarily limit the present invention to only one such component or aspect, but should be interpreted generally to mean one or more, as may be suitable and desirable in each particular instance.

As used throughout this patent, the following terms have the following meanings:

(i) The term "mailer" and variations thereof includes any configuration or type of container capable of holding or carrying one or more document or other object that is transmittable via mail or other delivery from a sender to a recipient, such as, without limitation, envelopes, carriers, packages, foldable mail piece and forms. The present invention is not limited to the type of item that may be a mailer, which may be constructed of any suitable material such as paper, card stock, plastic, synthetic material, light or heavy weight material, coated or uncoated material or any combination thereof. Some examples of different types of mailer envelopes are traditional letter envelopes, overnight carrier envelopes, foldable mailers, carriers, self-mailers, welded seam envelopes, open side envelopes and open end envelopes, delivery or carrier envelope of any size, such as DVD mail pieces and overnight carrier mail pieces (FEDEX, US Postal Service, Airborne, etc.).

(ii) The term "form" and variations thereof means one or more sheet or piece of material that may or may not be folded. A form may be perforated to create one or more detachable sections. A form may include multiple sheets that may, or may not, be connected and/or detachable. Forms may, for example, be foldable mailers, self-mailers and inserts.

(iii) The term "insert" and variations thereof means an item of any configuration and construction that can be placed or located within a mailer. An insert may have multiple sheets and/or folds and may be attached to the envelope. Examples of inserts are forms, a panel of an envelope and an extension of a panel of an envelope.

(iv) The term "affixation mechanism" and variations thereof means one or more glue area, spot or strip, peel-n-seal, remoisten glue, moisten-and-seal glue, pressure seal glue, self-seal contact glue, fugitive glue or any other suitable material or device for closing or sealing an envelope or affixing one component or part of an envelope to another part or component.

Referring initially to FIG. 1, an embodiment of a reusable mailer 10 capable of preventing the undesirable positioning during re-mailing thereof of at least one postal marking that may be made to the mailer 10 during processing of the initial mailing thereof is shown. The reusable mailer 10 includes a front panel 14 and a rear panel 18, a first end 22 having an opening 26 and a second end 32 opposite to the first end 22 and having a closure 36. As used throughout this patent, the term "closure" and variations thereof means one or more pocket, fold or other closed portion or being at least partially sealed or closed. The front and rear panels 14, 18 have respective first ends 40, 44 and second ends 48, 52 corresponding to the first and second ends 22, 32 of the mailer 10, respectively. Each of the first ends 40, 44 of the front and rear panels 14, 18 terminates at a respective edge 56, 60. If desired, at least one window 90 may be formed in the front and/or back panels 14, 18 to allow mailing information, such as, for example, addresses and postage printed on an insert, to be visible during the initial and/or re-mailing of the mailer 10.

Still referring to the embodiment of FIG. 1, a perforation line 64 is formed in the front panel 14 in spaced proximity with the edge 56 of the front panel 14. A fold line 72 is provided on the front panel 14 in spaced proximity with the perforation line 64 and between the perforation line 64 and the second end 48 of the front panel 14. A removable initial seal flap 68 extends from the perforation line 64 to the edge 56 of the front panel 14 so that when the front panel 14 is folded along the perforation line 64, the initial seal flap 68 covers the opening 26 of the mailer 10 and is sealable, such as with an affixation mechanism 70 or method, to the rear panel 18 for the initial mailing of the mailer 10.

As shown in FIG. 2, the initial seal flap 68 of this embodiment is removable from the mailer 10 upon separating at the perforation line 64. Referring to FIG. 3, after the illustrated initial seal flap 68 (FIG. 2) is removed from the mailer 10, the front panel 14 is foldable along the fold line 72 to form a re-seal flap 76 that covers the opening 26 of the mailer 10 and is sealable, such as with an affixation mechanism 70 or method, to the rear panel 18 for re-mailing the mailer 10. During re-mailing of the illustrated mailer 10, any postal marking 78 made during the initial mailing thereof to the initial seal flap 68 (e.g. FIGS. 1, 2) will be removed from the mailer 10, and any postal marking 78 made during the initial mailing thereof to the front panel 14 between the fold line 72 and the perforation line 64 (e.g. FIG. 3) will be located on the re-seal flap 76 affixed to the rear panel 18. For example, the postal marking(s) 78 may be an outbound spray postnet tag or bar code 82 and/or an outbound spray florescent code or ID tag 84.

Referring again to FIG. 1, if desired, the initial seal flap 68 and/or re-seal flap 76 may be sized to in an effort to capture postal markings 78. For example, the length of the initial seal flap 68 and/or the re-seal flap 76 may be at least approximately 0.50 inches to capture postal markings 78 made to the mailer 10 proximate to the perforation line 64. However, the present invention is not limited by the existence, location, type, size, quantity or other characteristic of postal markings.

In this embodiment, the second end 32 of the mailer 10 is at the top of the mailer 10 during the initial mailing. Thus, the mailer 10 of FIG. 1 is in position for its initial mailing, having its initial mailing information (not shown) upright and readable. For re-mailing the mailer 10, the mailer 10 may be configured or used so that the second end 32 is at the top (FIG. 3), the first end 22 is at the top (FIG. 4) or either end 32, 22 maybe at the top of the mailer 10, as desired.

An example instance where the second end 32 remains at the top of the mailer 10 for re-mailing is shown in the embodiment of FIGS. 5A-F. In this instance, as shown in FIG. 5A, the mailer 10 includes a re-mail FIM graphic 94 disposed upon the front panel 14 at its second end 48. As shown in FIG. 5B, the mailing information 98 for the initial mailing of the mailer 10 is upright and readable when the second end 32 of the mailer 10 is at the top. For the re-mail FIM graphic 94 positioned as shown to be readable in processing the mailer 10 during re-mailing, the second end 32 would need to continue to be at the top of the mailer 10 during re-mailing, as shown in FIG. 5E, where the mailing information 98 for re-mailing the mailer 10 is upright and readable.

FIGS. 6A-F provide an embodiment showing a mailer 10 having its first end 22 at the top during re-mailing. In this example, as shown in FIG. 6A, a re-mail FIM graphic 94 is disposed upon the front panel 14 adjacent to the fold line 72 and extending toward the second end 48 of the front panel 14. As shown in FIG. 6B, the mailing information 98 for the initial mailing of the mailer 10 is upright and readable when the second end 32 of the mailer 10 is at the top. However, for the re-mail FIM graphic 94 positioned as shown to be readable in processing the mailer 10 during re-mailing, the mailer 10 would need to be inverted, as shown in FIG. 6E, whereby the first end 22 of the mailer 10 is at the top and fold line 72 serves as the top edge of the mailer 10.

If desired, the removable initial seal flap 68 may have an extended length for any suitable purpose. Referring to the embodiment of FIGS. 7-10, for example, the length 96 of the initial seal flap 68 may be sufficient so that its outer surface 100 adequately displays initial mailing information 102 (e.g. sender and recipient addresses, postage information, etc.), such as by printing or label. In this embodiment, the initial seal flap 68 has a length 96 that nearly entirely covers the rear panel 18 during initial mailing of the mailer 10. In another example, the initial seal flap 68 may have a length 96 that is at least approximately half the length (not shown) of the rear panel 18. For yet another example, the length 96 of the initial seal flap 68 may be at least approximately three inches (not shown). If desired and suitable, the re-mail mailing information 104 may be provided, such as by printing or label, on the rear panel 18 of the mailer 10.

Now referring to FIG. 11, another embodiment of a reusable mailer 10 capable of preventing the undesirable positioning during re-mailing thereof of at least one postal marking that may be made to the mailer during processing of the initial mailing thereof is shown. In this example, a first fold line 110 is formed in the rear panel 18 in spaced proximity with the edge 60 of the rear panel 18. A removable initial seal flap 68 on the rear panel 18 extends between the first fold line 110 and the edge 60 of the rear panel 18. When the rear panel 18 is folded along the first fold line 110, the initial seal flap 68 covers the opening 26 of the mailer 10 and is sealable to the front panel 14 for the initial mailing of the mailer 10.

Still referring to the embodiment of FIG. 11, a perforation line 112 is formed in the rear panel 18 in spaced proximity to the first fold line 110 and between the first fold line 110 and the second end 52 of the rear panel 18. As shown in FIG. 12, the initial seal flap 68 is removable from the mailer 10 upon separating at the perforation line 112. Referring to FIG. 13, after the initial seal flap 68 is removed from the mailer 10, the front panel 14 is foldable along a second fold line 114 to form a re-seal flap 76 that covers the opening 26 of the mailer 10 and is sealable to the rear panel 18 for re-mailing the mailer 10.

During re-mailing of the illustrated mailer 10, any postal marking 78 (e.g. FIGS. 11, 12) made during the initial mailing thereof to the initial seal flap 68 and on the rear panel between the perforation line 112 and the first fold line 110 will be removed from the mailer 10. For example, the postal marking (s) 78 may be an outbound spray postnet tag or bar code 82 and/or an outbound spray florescent code or ID tag 84.

Still referring to the embodiment of FIG. 11, if desired, any among the initial seal flap 68, re-seal flap 76 and that portion of the rear panel 18 between the perforation line 112 and the first fold line 110 may be sized to in an effort to capture postal markings 78. For example, the length of any among the initial seal flap 68, portion of the rear panel 18 between the perforation line 112 and the first fold line 110 and/or the re-seal flap 76 may be at least approximately 0.50 inches to capture postal markings 78 made to the mailer 10 proximate to the first end 22 of the mailer 10 during the initial mailing thereof. Again however, the present invention is not limited by the existence, location, type, size, quantity or other characteristic of postal markings.

In this embodiment, the second end 32 of the mailer 10 is at the top of the mailer 10 during the initial mailing. Thus, the mailer 10 of FIG. 11 is in position for its initial mailing, having its initial mailing information (not shown) upright and readable. For re-mailing the mailer 10, the mailer 10 may be configured or used so that the second end 32 is at the top (FIG. 13), the first end 22 is at the top (FIG. 14) or either end 32, 22 may be at the top of the mailer 10, as desired.

An example instance where the second end 32 remains at the top of the mailer 10 for re-mailing is shown in the embodiment of FIGS. 15A-F. In this instance, as shown in FIG. 15A, the mailer 10 includes a re-mail FIM graphic 94 disposed upon the front panel 14 at its second end 48. The mailing information 98 for the initial mailing of the mailer 10 is upright and readable when the second end 32 of the mailer 10 is at the top. For the re-mail FIM graphic 94 positioned as shown to be readable in processing the mailer 10 during re-mailing, the second end 32 would need to continue to be at the top of the mailer 10 during re-mailing, as shown in FIG. 15E, where the mailing information 98 for re-mailing the mailer 10 is upright and readable.

FIGS. 16A-F provide an embodiment showing a mailer 10 having its first end 22 at the top during re-mailing. In this example, as shown in FIG. 16C, a re-mail FIM graphic 94 is disposed upon the front panel 10 adjacent to the second fold line 114 and extending toward the second end 48 of the front panel 14 and, during the initial mailing of the mailer, is at least partially concealed (FIG. 16A) by the initial seal flap 68. As shown in FIGS. 16A and 16C, the mailing information 98 for the initial mailing of the mailer 10 is upright and readable when the second end 32 of the mailer 10 is at the top. However, for the re-mail FIM graphic 94 positioned as shown to be readable in processing the mailer 10 during re-mailing, the mailer 10 would need to be inverted, as shown in FIG. 16E, whereby the first end 22 of the mailer 10 is at the top and second fold line 114 serves as the top edge of the mailer 10.

If desired, the removable initial seal flap 68 may have an extended length for any suitable purpose. Referring to the embodiment of FIGS. 17-20, for example, the length 96 of the initial seal flap 68 may be sufficient so that its outer surface 100 adequately displays initial mailing information 102, such as by printing or label. In this embodiment, the initial seal flap 68 has a length 96 that nearly entirely covers the front panel 14 during initial mailing of the mailer 10. In another example, the initial seal flap 68 may have a length 96 that is at least approximately half the length of the front panel 14. For yet another example, the length 96 of the initial seal flap 68 may be at least approximately three inches. If desired and suitable, the re-mail mailing information 104 may be provided on the front panel 14 of the mailer 10, such as by printing or label.

Preferred embodiments of the present invention thus offer advantages over the prior art and are well adapted to carry out one or more of the objects of the invention. However, the present invention does not require each of the components and acts described above and is in no way limited to the above-described embodiments, methods of operation, variables, values or value ranges. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods described above and claimed herein and any other methods which may fall within the scope of the appended claims can be performed in any desired suitable order and are not necessarily limited to the sequence described herein or as may be listed in the appended claims. Further, the methods of the present invention do not require use of the particular embodiments shown and described in the present application, but are equally applicable with any other suitable structure, form and configuration of components.

While preferred embodiments of this invention have been shown and described, many variations, modifications and/or changes of the system, apparatus and methods of the present invention, such as in the components, details of construction and operation, arrangement of parts and/or methods of use, are possible, contemplated by the patent applicant, within the scope of the appended claims, and may be made and used by one of ordinary skill in the art without departing from the spirit or teachings of the invention and scope of appended claims. Thus, all matter herein set forth or shown in the accompanying drawings should be interpreted as illustrative and the scope of the invention and the appended claims should not be limited to the embodiments described and shown herein.

The invention claimed is:

1. A reusable mailer useful for preventing the undesirable positioning during re-mailing thereof of at least one postal marking that may be made to the mailer during processing of the initial mailing thereof, the reusable mailer having a front panel and a rear panel, a first end having an opening, and a second end opposite to the first end and having a closure, the front and rear panels having respective first and second ends corresponding to the first and second ends of the mailer, respectively, each of the first ends of the front and rear panels terminating at a respective edge, the reusable mailer comprising:

a perforation line formed in the front panel in spaced proximity with the edge of the front panel;

a removable initial seal flap extending from said perforation line to the edge of the front panel, said initial seal flap being capable of covering the opening of the mailer and being sealable to the rear panel for the initial mailing of the mailer when the front panel is folded along said perforation line, and wherein said initial seal flap is removable from the mailer upon separating at said perforation line;

a fold line disposed on the front panel in spaced proximity with said perforation line and between said perforation line and the second end of the front panel, wherein after said initial seal flap is removed from the mailer, the front panel is foldable along said fold line to form a re-seal flap that covers the opening of the mailer and is sealable to the rear panel for re-mailing the mailer; and a re-mail FIM graphic disposed upon the front panel adjacent to the second end of the front panel, wherein the second end of the mailer serves as the top of the mailer during the initial mailing and the re-mailing of the mailer, whereby during re-mailing of the mailer, any postal markings made during the initial mailing thereof to said initial seal flap will be removed from the mailer and any postal markings made during the initial mailing of the mailer to the front panel between said fold line and said perforation line will be located on said re-mail flap affixed to the rear panel.

2. The reusable mailer of claim 1, wherein the length of said initial seal flap is at least approximately 0.50 inches.

3. The reusable mailer of claim 2, wherein the length of said re-seal flap is at least approximately 0.50 inches.

4. The reusable mailer of claim 1, further including at least one window formed in at least one among the front and back panels, said at least one window through which mailing information is visible during at least one among the initial and re-mailing of the mailer.

5. The reusable mailer of claim 4, wherein said at least one window includes a first window formed in the front panel of the mailer through which initial mailing information is visible during the initial mailing of the mailer and re-mail mailing information is visible during the re-mailing of the mailer.

6. The reusable mailer of claim 5, further including at least one insert insertable into the mailer through the opening, said at least one insert bearing at least one among initial mailing information and re-mail mailing information visible through said first window of the mailer when the insert is disposed within the mailer.

7. The reusable mailer of claim 1, wherein said initial seal flap includes an outer surface that is visible when said initial seal flap is affixed to the rear panel for the initial mailing of the mailer, wherein said initial seal flap has a length sufficient for said outer surface to display initial mailing information, whereby the initial mailing information is provided on said outer surface of said initial seal flap.

8. The reusable mailer of claim 7, wherein when said initial seal flap is affixed to the real panel for the initial mailing of the mailer, said initial seal flap covers at least approximately half the length of the rear panel.

9. The reusable mailer of claim 7, wherein when said initial seal flap is affixed to the real panel for the initial mailing of the mailer, said initial seal flap covers at least substantially the entire rear panel.

10. The reusable mailer of claim 7, wherein the rear panel of the mailer includes at least one among re-mail mailing information and a window through which re-mail mailing information is visible.

11. The reusable mailer of claim 10, wherein said initial seal flap at least partially covers the re-mail mailing information.

12. The reusable mailer of claim 7, further including at least one window formed in the front panel of the mailer, said at least one window through which at least one among initial and re-mail mailing information is visible during at least one among the initial and re-mailing of the mailer.

13. The reusable mailer of claim 1, wherein the rear panel of the mailer includes at least one among re-mail mailing information and a window through which re-mail mailing information is visible, further wherein said initial seal flap at least partially covers the re-mail mailing information.

14. The reusable mailer of claim 1, wherein when said initial seal flap is affixed to the real panel for the initial mailing of the mailer, said initial seal flap covers approximately half the length of the rear panel.

15. The reusable mailer of claim 14, further including at least one window formed in the front panel of the mailer, said at least one window through which mailing information is visible during at least one among the initial and re-mailing of the mailer.

16. The reusable mailer of claim 14, wherein when said initial seal flap is affixed to the real panel for the initial mailing of the mailer, said initial seal flap covers at least substantially the entire rear panel.

17. The reusable mailer of claim 16, further including at least one window formed in the front panel of the mailer, said at least one window through which at least one among initial and re-mail mailing information is visible during at least one among the initial and re-mailing of the mailer.

18. The reusable mailer of claim 1, wherein the length of said initial seal flap is at least three inches.

19. A reusable mailer useful for removing, concealing or repositioning during re-mailing thereof of at least one among at least one postnet barcode, ID marking, florescent code, postal marking and corrective spray address information that may be made to the mailer during postal processing of the initial mailing thereof to ensure the same does not negatively affect the postal processing of the mailer during re-mailing thereof, the reusable mailer having a front panel and a rear panel, a first end having an opening, and a second end opposite to the first end and having a closure, the front and rear panels having respective first and second ends corresponding to the first and second ends of the mailer, respectively, each of the first ends of the front and rear panels terminating at a respective edge, the reusable mailer comprising:

a removable initial seal flap disposed upon at least one among the front and rear panels, said initial seal flap being capable of covering the opening of the mailer and being engageable to the other of the front and rear panels for the initial mailing of the mailer, wherein the first end of the mailer serves as the bottom of the mailer during the initial mailing thereof;

a re-mail FIM graphic disposed upon the front panel adjacent to one of the second end of the front panel and a fold line disposed on the front panel, wherein when the re-mail FIM graphic is adjacent the second end of the mailer, the second end of the mailer serves as the top of the mailer during the initial mailing and the re-mailing of the mailer, and when the re-mail FIM graphic is adjacent to the fold line and extending at least partially between the fold line and the second end of the front panel, the fold line serves as the top edge of the mailer during the re-mailing thereof and the first end of the mailer serves as the top of the mailer during the re-mailing thereof; and a re-seal flap disposed upon at least one among the front and rear panels, said re-seal flap being capable of covering the opening of the mailer and being sealable to the other of the front and rear panels for re-mailing the mailer, whereby, during re-mailing of the mailer, at least one among at least one postnet barcode, ID marking, florescent code, postal marking and corrective spray address information that may be made to the mailer during postal processing of the initial mailing thereof are removed from, concealed on or repositioned on the mailer during re-mailing thereof to ensure the same does not negatively affect the postal processing of the mailer during re-mailing.

20. A reusable mailer useful for preventing the undesirable positioning during re-mailing thereof of at least one postal marking that may be made to the mailer during processing of the initial mailing thereof, the reusable mailer having a front panel and a rear panel, a first end having an opening, and a second end opposite to the first end and having a closure, the front and rear panels having respective first and second ends corresponding to the first and second ends of the mailer, respectively, each of the first ends of the front and rear panels terminating at a respective edge, the reusable mailer comprising:

a perforation line formed in the front panel in spaced proximity with the edge of the front panel;

a removable initial seal flap extending from said perforation line to the edge of the front panel, said initial seal flap being capable of covering the opening of the mailer and being sealable to the rear panel for the initial mailing of the mailer when the front panel is folded along said perforation line, and wherein said initial seal flap is removable from the mailer upon separating at said perforation line;

a fold line disposed on the front panel in spaced proximity with said perforation line and between said perforation line and the second end of the front panel, wherein after said initial seal flap is removed from the mailer, the front panel is foldable along said fold line to form a re-seal flap that covers the opening of the mailer and is sealable to the rear panel for re-mailing the mailer; and wherein the second end of the mailer serves as the top of the mailer during the initial mailing of the mailer, further including a re-mail FIM graphic disposed upon the front panel adjacent to said fold line and extending at least partially between said fold line and the second end of the front panel, wherein said fold line serves as the top edge of the mailer during the re-mailing thereof and the first end of the mailer serves as the top of the mailer during the re-mailing thereof, whereby during re-mailing of the mailer, any postal markings made during the initial mailing thereof to said initial seal flap will be removed from the mailer and any postal markings made during the initial mailing of the mailer to the front panel between said fold line and said perforation line will be located on said re-mail flap affixed to the rear panel.

21. The reusable mailer of claim 20, wherein said re-mail FIM graphic is at least partially concealed by said initial seal flap during the initial mailing of the mailer and being fully visible during re-mailing of the mailer.

22. The reusable mailer of claim 21 wherein the at least one opening of the mailer covered by said initial seal flap during the initial mailing of the mailer is at the bottom of the mailer during the initial mailing of the mailer, further wherein said re-mail FIM graphic is fully concealed by said initial seal flap during the initial mailing of the mailer.

* * * * *